US012130382B2

(12) United States Patent
Gong

(10) Patent No.: US 12,130,382 B2
(45) Date of Patent: Oct. 29, 2024

(54) LIDAR CONTROL METHOD, TERMINAL APPARATUS, AND COMPUTER-READABLE STORAGE MEDIUM

(71) Applicant: SUTENG INNOVATION TECHNOLOGY CO., LTD., Shenzhen (CN)

(72) Inventor: Changsheng Gong, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/088,750

(22) Filed: Dec. 26, 2022

(65) Prior Publication Data

US 2023/0204723 A1    Jun. 29, 2023

(30) Foreign Application Priority Data

Dec. 27, 2021    (CN) .......................... 202111615485.1

(51) Int. Cl.
*G01S 7/48* (2006.01)
*G01S 7/481* (2006.01)
*G01S 7/487* (2006.01)
*G01S 7/493* (2006.01)

(52) U.S. Cl.
CPC .......... *G01S 7/4802* (2013.01); *G01S 7/4817* (2013.01); *G01S 7/4876* (2013.01); *G01S 7/493* (2013.01)

(58) Field of Classification Search
None
See application file for complete search history.

(56) References Cited

U.S. PATENT DOCUMENTS

| 2019/0293768 | A1 | 9/2019 | Subasingha et al. |
| 2019/0391270 | A1 | 12/2019 | Uehara |
| 2020/0033450 | A1* | 1/2020 | Zhang .................. G01S 7/4815 |

(Continued)

FOREIGN PATENT DOCUMENTS

CN    111868560 A    10/2020

OTHER PUBLICATIONS

First Office Action issued in related Chinese Application No. 202111615485.1, mailed Aug. 24, 2023, 8 pages.
(Continued)

*Primary Examiner* — Eric L Bolda
(74) *Attorney, Agent, or Firm* — BAYES PLLC

(57) ABSTRACT

The present application is applicable to the technical field of a LiDAR, and provides a LiDAR control method, a terminal apparatus, and a computer-readable storage medium. The LiDAR control method includes the following steps: acquiring first echo data; when an oversaturated region is determined to exist according to the first echo data, controlling LiDAR to measure a scanning region according to a second preset scanning mode to obtain second echo data; performing data fusion processing based on the first echo data and the second echo data to obtain target data. The LiDAR is controlled to measure according to the first preset scanning mode and a second preset scanning mode, and then fusion is performed based on the measured first echo data and second echo data, thereby effectively eliminating a problem of signal crosstalk caused by too high reflection energy of an object with high reflectivity, and effectively improving measurement accuracy.

6 Claims, 13 Drawing Sheets

(56) References Cited

U.S. PATENT DOCUMENTS

| | | | |
|---|---|---|---|
| 2023/0129970 A1* | 4/2023 | Liang | G01S 7/4863 |
| | | | 356/5.01 |
| 2023/0146289 A1* | 5/2023 | Ta | G01S 7/4817 |
| | | | 356/4.01 |
| 2023/0204771 A1* | 6/2023 | Gong | G01S 7/4815 |
| | | | 356/4.01 |

OTHER PUBLICATIONS

European Search Report issued in related European Application No. 22216870.0, mailed Aug. 1, 2023, 14 pages.

\* cited by examiner

LIDAR CONTROL METHOD, TERMINAL APPARATUS, AND COMPUTER-READABLE STORAGE MEDIUM

CROSS-REFERENCE TO RELATED APPLICATION

The present application claims the benefit of priority to China Patent Application No. CN202111615485.1, filed on Dec. 27, 2021, the content of which is incorporated herein by reference in its entirety.

TECHNICAL FIELD

The present application belongs to the technical field of LiDAR, and in particular to a LiDAR control method, a terminal apparatus, and a computer-readable storage medium.

BACKGROUND

LiDAR is often used in automatic driving, logistics vehicle, robot, public intelligent transportation, and other fields because of the advantages of high resolution, high sensitivity, strong anti-interference ability, and no influence by dark conditions.

When a laser emitted by a LiDAR detects a target object with high reflectivity, the energy of echo signals reflected by the target object with the high reflectivity is relatively high, which causes crosstalk among respective receiving units in a receiving array and leads to inaccurate measurement results.

SUMMARY

An embodiment of the present application provides a LiDAR control method, a terminal apparatus, and a computer-readable storage medium to solve a problem that inaccurate measurement results caused by crosstalk among respective receiving units in a receiving array caused by high energy of echo signals reflected by a target object with high reflectivity at present.

In a first aspect, an embodiment of the present application provides a LiDAR control method, including:

acquiring first echo data, the first echo data being collected by a receiving array after a LiDAR emits a laser beam according to a first preset scanning mode for measurement;

when an oversaturated region is determined to exist according to the first echo data, controlling the LiDAR to measure a scanning region according to a second preset scanning mode to obtain second echo data; and performing data fusion processing based on the first echo data and the second echo data to obtain target data.

In one implementation of the first aspect, after the step of acquiring the first echo data, the method further includes:

determining whether the oversaturated region is provided according to the first echo data:

when it is determined based on the first echo data that the oversaturated region is not provided, determining whether a plurality of measurements are required according to a configuration condition of the LiDAR:

when it is determined that the plurality of measurements are required, controlling the LiDAR to perform the plurality of measurements according to the first preset scanning mode to obtain a plurality of measurement results, and determining the target data according to the plurality of measurement results.

In one implementation of the first aspect, the step of determining whether the oversaturated region is provided based on the first echo data includes:

extracting echo signals according to the first echo data:

acquiring amplitudes of the echo signals and determining a maximum amplitude of the echo signals;

determining whether the maximum amplitude of the echo signals is greater than or equal to a saturation threshold;

if the maximum amplitude of the echo signals is greater than or equal to the saturation threshold, counting a number of the echo signals having amplitudes exceeding the saturation threshold; otherwise, determining that there is no oversaturated region;

determining whether the number of the echo signals having the amplitudes exceeding the saturation threshold is greater than or equal to a width threshold;

if the number of the echo signals having the amplitudes exceeding the saturation threshold is greater than or equal to the width threshold, determining that there is an oversaturated region; otherwise, determining that there is no oversaturated region.

In one implementation of the first aspect, the second preset scanning mode is as follows: controlling an emitting unit corresponding to the oversaturated region to emit a laser beam for measurement, independently receiving, by a receiving unit, the laser, controlling an emitting unit corresponding to a non-oversaturated region to emit a laser beam in parallel, and receiving in parallel, by the receiving unit, the laser beams.

In an implementation mode of the first aspect, the second preset scanning mode is as follows: controlling only the emitting unit corresponding to the non-oversaturated region to emit the laser in parallel, and receiving in parallel, by the receiving unit, the laser.

In an implementation mode of the first aspect, the step of performing the data fusion processing based on the first echo data and the second echo data to obtain the target data includes:

determining echo data of the oversaturated region and echo data of the non-oversaturated region for the data fusion processing based on the first echo data and the second echo data;

performing the data fusion processing on the echo data of the oversaturated region and the echo data of the non-oversaturated region to obtain the target data.

In one implementation of the first aspect, the step of determining the echo data of the oversaturated region and the echo data of the non-oversaturated region for the data fusion processing based on the first echo data and the second echo data includes:

extracting the echo data of the oversaturated region via the first echo data, and extracting the echo data of the non-oversaturated region via the second echo data; or, extracting the echo data of the oversaturated region and the echo data of the non-oversaturated region via the second echo data; or, extracting the first echo data of the oversaturated region via the first echo data, extracting the second echo data of the oversaturated region via the second echo data, filtering the first echo data of the oversaturated region and the second echo data of the oversaturated region to obtain the filtered echo data of the oversaturated region, and extracting the echo data of the non-oversaturated region via the second echo data.

In a second aspect, the embodiment of the present application provides a terminal apparatus, including:

an acquiring unit, configured to acquire first echo data; the first echo data is acquired by a receiving array after a LiDAR emitting a laser beam according to a first preset scanning mode for measurement;

a control unit, configured to control the LiDAR to measure a scanning region according to a second preset scanning mode when it is determined based on the first echo data that there is an oversaturated region, to obtain second echo data; and a fusion processing unit, configured to perform data fusion processing based on the first echo data and the second echo data to obtain target data.

In a third aspect, the embodiment of the present application provides a terminal apparatus, including a processor, a storage, and computer program stored in the storage and executable on the processor. The processor implements the LiDAR control method as described in the first aspect or any optional manner of the first aspect when executing the computer program.

In a fourth aspect, the embodiment of the present application provides a computer-readable storage medium, having a computer program stored therein. When the computer program is executed by a processor, the computer-readable storage medium implements the LiDAR control method as described in the first aspect or any optional manner of the first aspect.

In a fifth aspect, the embodiment of the present application provides a computer program product. When the computer program product is operated on a terminal apparatus, the terminal apparatus performs the LiDAR control method of the first aspect or any optional manner of the first aspect.

Compared with the prior art, the embodiment of the present application has the following beneficial effects:

A LiDAR control method, a terminal apparatus, a computer-readable storage medium, and a computer program product provided by the embodiment of the present application have the following beneficial effects:

For the LiDAR control method provided by the embodiment of the present application. LiDAR is controlled to measure according to a first preset scanning mode and a second preset scanning mode, and then fusion is performed based on first echo data and second echo data obtained by measurement, thereby effectively eliminating a problem of signal crosstalk caused by too high reflection energy of an object with high reflectivity, effectively improving measurement accuracy, and solving a problem of inaccurate measurement results caused by crosstalk among respective receiving units of a receiving array caused by relatively high energy of echo signals reflected by a target object with high reflectivity at present.

BRIEF DESCRIPTION OF THE DRAWINGS

To explain embodiments of the present application or the technical solutions more clearly, the following briefly introduces the drawings in the embodiments or the prior art. Obviously. The drawings in the following description are only some embodiments of the present application. The person skilled in the art can obtain other drawings based on these drawings without inventive labor.

DETAILED DESCRIPTION

The following description is for illustration but not for limitation. Specific details such as a particular system structure, a technique, and the like are set forth to provide a thorough understanding of an embodiment of the present application. However, it will be apparent to the person skilled in the art that the present application can be realized in other embodiments without these specific details. In other instances, detailed descriptions of a well-known system, a well-known apparatus, a well-known circuit, and a well-known method are omitted so as not to obstruct the description of the present application with unnecessary details.

It should be understood that the term "and/or" as used in the specification of the present application and the appended claims refers to any combination and all possible combinations of one or more of the associated listed items and includes such combinations. In addition, in the description of the specification and the appended claims, the terms "first," "second," "third," etc. are used to distinguish descriptions only and are not understood as indicating or implying relative importance.

It should also be understood that references to "one embodiment" or "some embodiments" or the like described in the specification of the present application mean that a particular feature, a structure, or a feature described in conjunction with the embodiment are included in one or more embodiments of the present application. Thus, statements "in one embodiment," "in some embodiments," "in other embodiments," "in other some embodiments," and the like appearing in different parts in the specification do not necessarily refer to the same embodiment, but mean "one or more but not all embodiments", unless otherwise specifically emphasized. The terms "comprise," "include," "have," and variations thereof all mean "comprises but not limited to" unless otherwise specifically emphasized.

A LiDAR is an automatic remote sensing apparatus which uses a laser as an emitting light source and photoelectric detection technology to detect. The LiDAR can include an emitting array, a receiving array, a scanning control system, and a data processing system. The working principle of the LiDAR is as follows. A detecting laser is emitted to a target object. After the detecting laser hits the target object, the target object reflects the detecting laser to form echo signals. The receiving array can receive the echo data and process the received echo data to obtain distance, size, speed, reflectivity, and other information of the target object.

Figure 1:
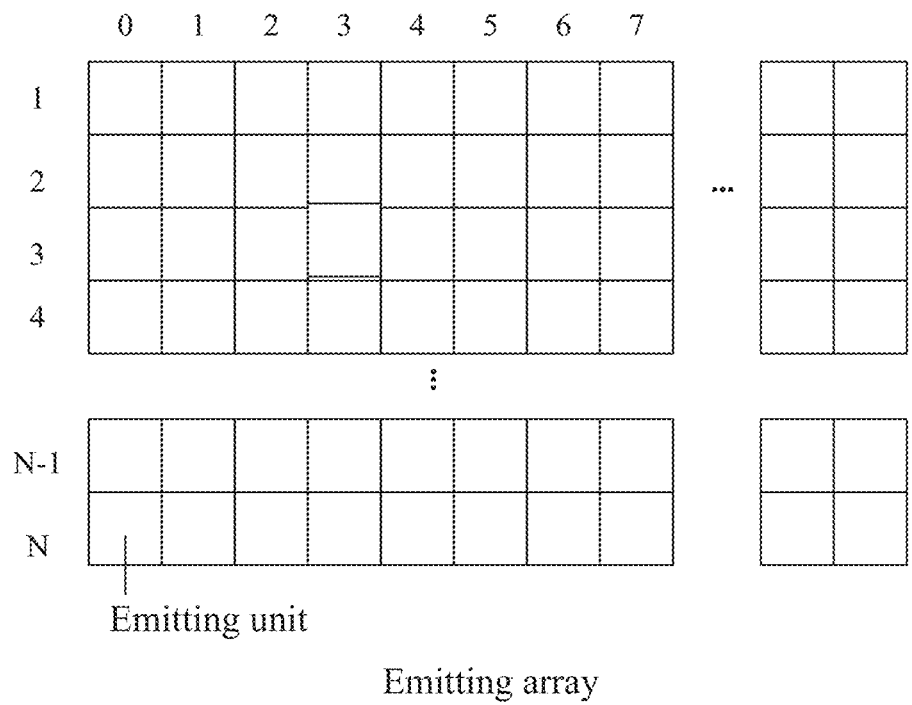
FIG. 1 is a schematic structural diagram of an emitting array and a receiving array of a LiDAR provided by an embodiment of the present application.
Figure 1:
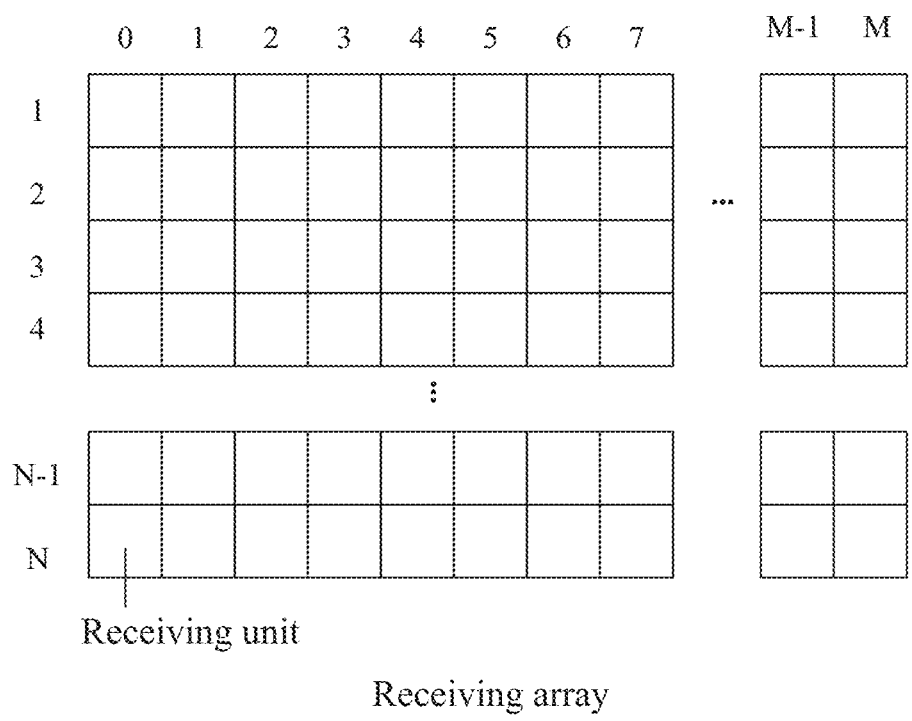

For example, FIG. 1 shows a schematic structural diagram of an emitting array and a receiving array of a LiDAR provided by an embodiment of the present application. As shown in FIG. 1, in an array-type LiDAR, the emitting array includes N rows and M columns of emitting units. The receiving array includes N rows and M columns of receiving units (the receiving units can be pixels). A laser emitted by one unit in the emitting array is received by one receiving unit in the receiving array.

A LiDAR control method provided by the embodiment of the present application is described in detail below.

Figure 2:
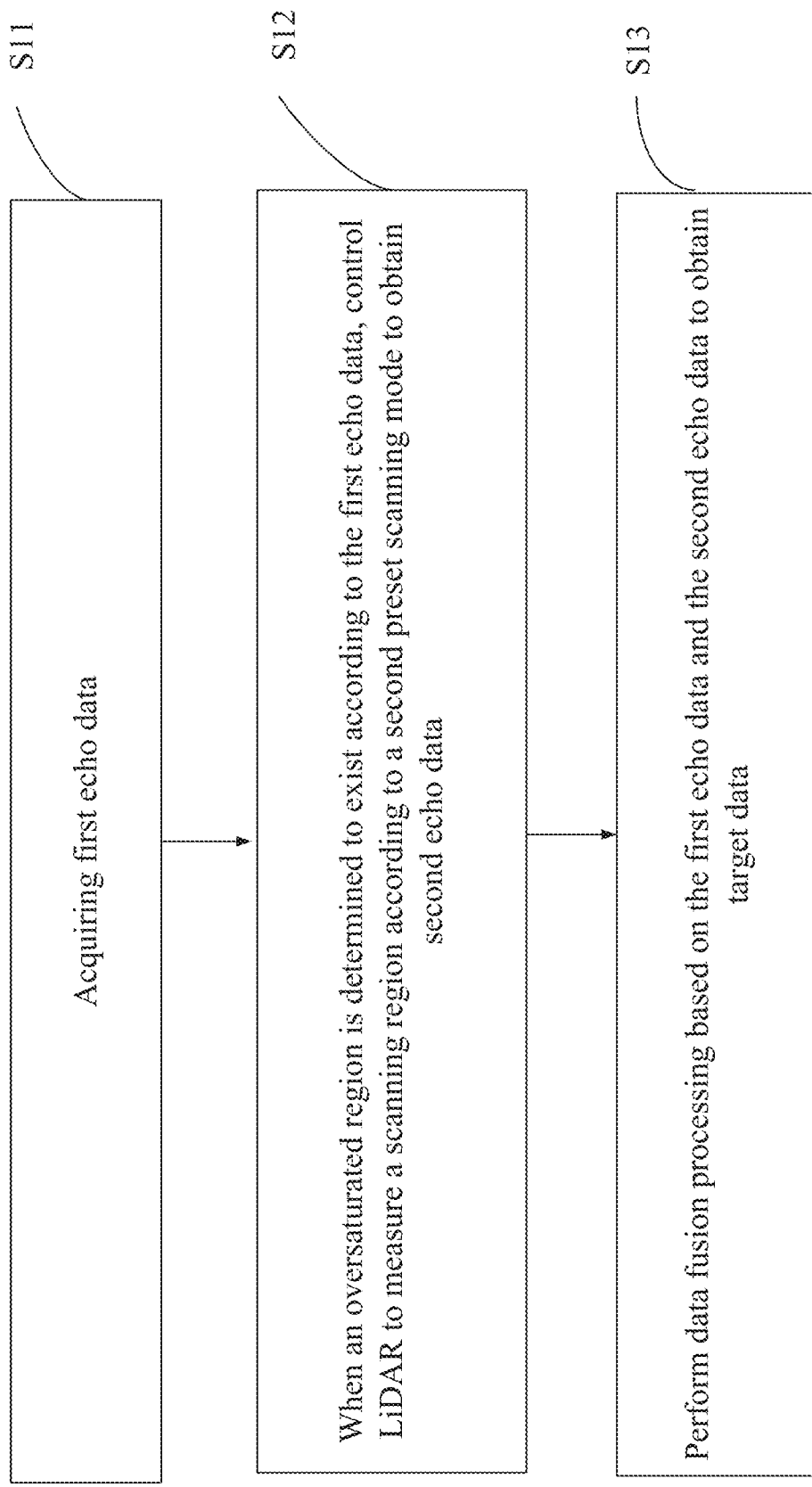
FIG. 2 is a schematic diagram of an implementation flow of a LiDAR control method provided by an embodiment of the present application.

FIG. 2 is a schematic flowchart of a LiDAR control method provided by an embodiment of the present application. An executive body of the LiDAR control method provided by the embodiment of the present application can be a scanning control system and a data processing system inside a LiDAR, and can also be a terminal apparatus connected to a LiDAR communication. The above terminal apparatus can be a mobile terminal such as a smartphone, a tablet computer or a wearable apparatus, or a computer, a cloud server, a LiDAR auxiliary computer, and other apparatuses in various application scenarios. It should be noted that the LiDAR control method provided by the embodiment of the present application is mainly applicable to an area array-type LiDAR product and an array-type LiDAR. The following is an example of taking the executive body as the terminal apparatus.

As shown in FIG. 2, the LiDAR control method provided by the embodiment of the present application can include S11 to S14, as detailed below.

S11: acquiring a first echo data.

In the embodiment of the present application, the first echo data are collected by a receiving array after being measured by the LiDAR emitting a laser beam according to a first preset scanning mode.

In the embodiment of the present application, the first echo data can be obtained by controlling an emitting array of the array-type LiDAR to emit a laser beam according to the first preset scanning mode to scan a scanning region thereof, and by then receiving echo data reflected by a target object in the scanning region via a receiving unit in the receiving array.

In an embodiment of that present application, the first preset scanning mode indicates the following measurement mode: controlling a whole row of emitting units in the emitting array to emit laser beams in parallel, controlling the receiving array to receive the whole row, then controlling the next row of emitting units in the emitting array to transmit laser beams in parallel, and control the receiving array to receive the whole row until all the emitting units in the emitting array complete measurement.

Figure 3:
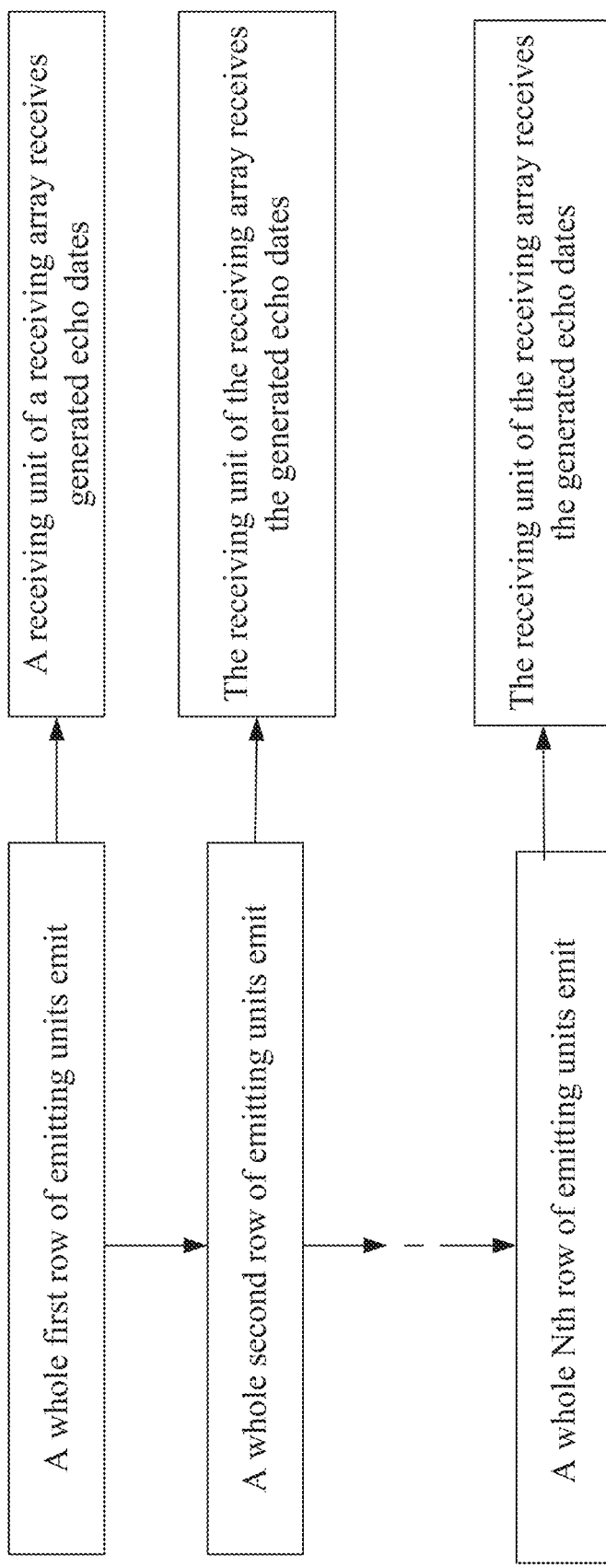
FIG. 3 is a control flow chart of a first preset scanning mode in an embodiment of the present application.

FIG. 3 shows a control flowchart of the first preset scanning mode in the embodiment of the present application. As shown in FIG. 3, the LiDAR controls a first row of emitting units in the emitting array to emit laser beams for the first time, and then the receiving units of the receiving array receive generated echo data. That is, the first echo data scanned by the first row is obtained. The LiDAR controls a second row of emitting units in the emitting array to emit laser beams in the whole row for the second time, and then the receiving units of the receiving array receive the generated echo data, and so on, until a last row (an Nth row) of emitting units in the emitting array completes measurement.

It should be noted that it is not necessary to control an order of laser beams emitted by a certain row of emitting units in the emitting array in the way of increasing the number of rows, and a measuring order of the number of rows can also be disturbed, only by ensuring that each row of emitting units in the emitting array completes the measurement, which is not limited herein.

It should also be noted that, in order to improve measurement accuracy, after all rows of the emitting units in the emitting array complete the measurement, the LiDAR can be controlled to re-measure the scanning region according to the first preset scanning mode so that a plurality of measurement results can be obtained. Filtering processing can be carried out based on the plurality of measurement results.

S12: when an oversaturated region is determined to exist according to the first echo data, controlling the LiDAR to measure the scanning region according to a second preset scanning mode to obtain second echo data.

In the embodiment of the present application, if the emitted laser detects an object with high reflectivity, the obtained echo data have an oversaturated region, which affects the measurement results. Therefore, when it is determined based on the first echo data that there is an oversaturated region, it is necessary to control the LiDAR to re-measure the scanning region in the second preset scanning mode to obtain second echo data that can be used to reduce a problem of crosstalk caused by oversaturated.

In the embodiment of the present application, the second preset scanning mode is as follows: controlling the emitting units corresponding to the oversaturated regions to emit laser beams for measurement; independently receiving the laser beams by receiving units; controlling the emitting units corresponding to non-oversaturated regions to emit laser beams in parallel; and receiving in parallel, by the receiving units, the laser beams.

Figure 4:
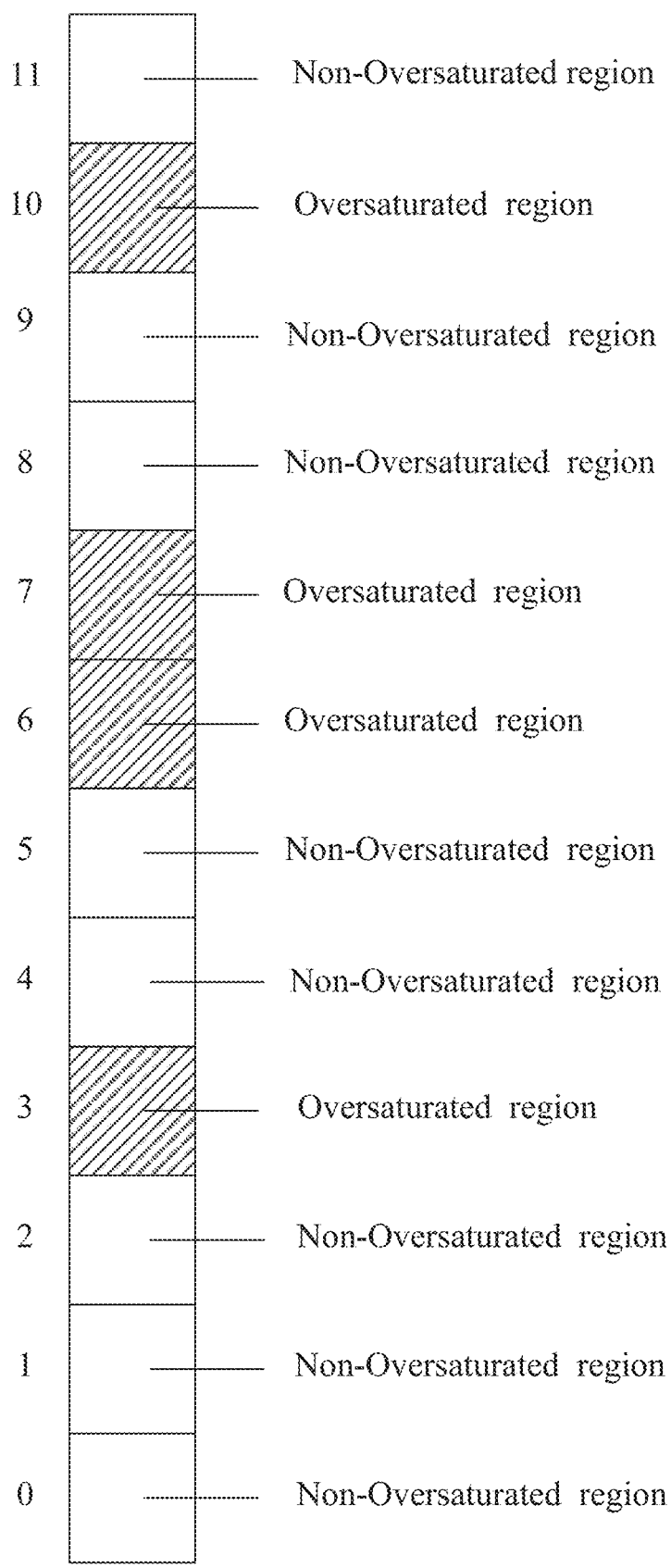
FIG. 4 is a schematic diagram of an oversaturated region and a non-oversaturated region in a row of emitting units shown in FIG. 1.

As an example, FIG. 4 shows a schematic diagram of the oversaturated regions and the non-oversaturated regions in a row of the emitting units. As shown in FIG. 4, an emitting unit 3, an emitting unit 6, an emitting unit 7, and an emitting unit 10 in this row are the emitting units corresponding to the oversaturated regions. An emitting unit 0, an emitting unit 1, an emitting unit 2, an emitting unit 4, an emitting unit 5, an emitting unit 8, an emitting unit 9, and an emitting unit 11 are the emitting units corresponding to the non-oversaturated regions.

Figure 5:
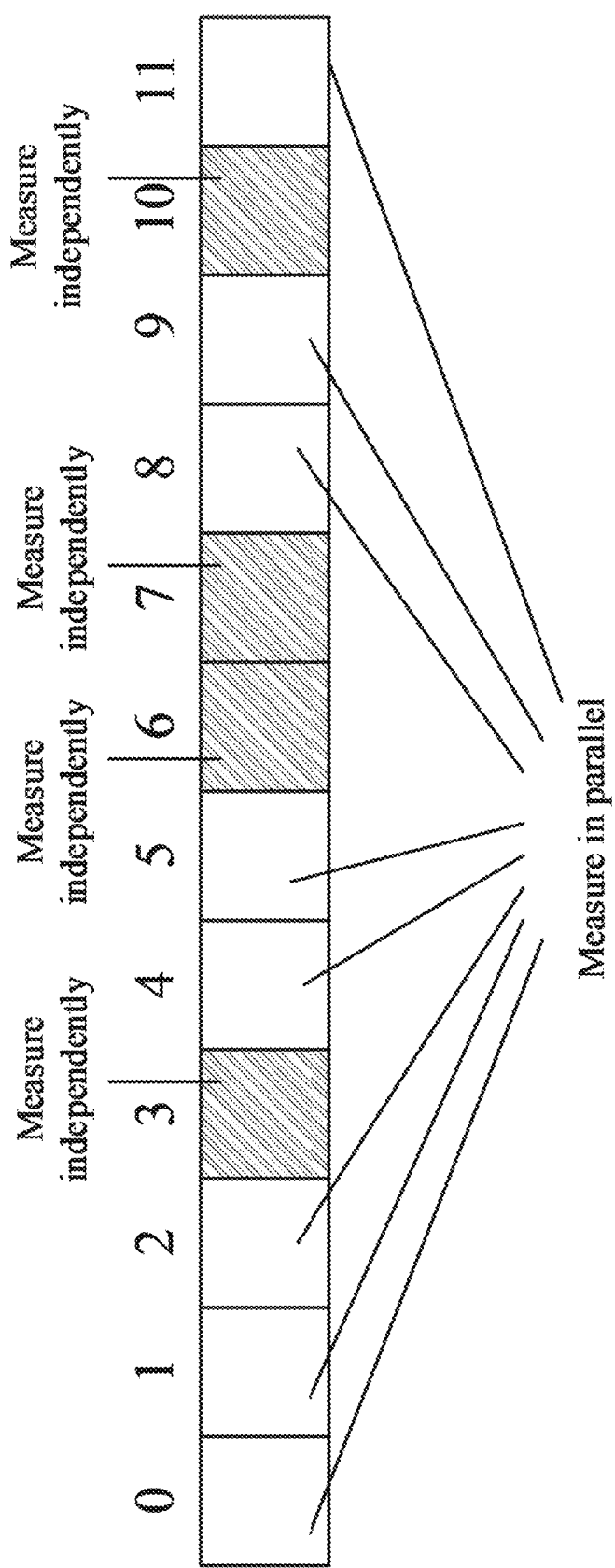
FIG. 5 is a schematic diagram of emission control for measuring a scanning region based on a second preset scanning mode in a LiDAR control method provided by an embodiment of the present application.

Accordingly, FIG. 5 shows a schematic diagram of emission control for measuring the scanning region based on the second preset scanning mode. As shown in FIG. 5, the LiDAR controls the emitting unit 3, the emitting unit 6, the emitting unit 7, and the emitting unit 10 to emit lasers independently for measurement. After the corresponding receiving unit receives each laser independently, the LiDAR controls the emitting unit 0, the emitting unit 1, the emitting unit 4, the emitting unit 5, the emitting unit 8, the emitting unit 9, and the emitting unit 11 to emit laser beams in parallel for measurement. The corresponding receiving units receive the echo data in parallel to obtain the second echo data.

It should be noted that the LiDAR can first control the emitting unit 0, the emitting unit 1, the emitting unit 4, the emitting unit 5, the emitting unit 8, the emitting unit 9, and the emitting unit 11 to emit laser beams in parallel for measurement. After the echo data are received in parallel by the corresponding receiving unit, the emitting unit 3, the emitting unit 6, the emitting unit 7, and the emitting unit 10 are controlled to emit the laser beams independently for measurement, and the corresponding receiving units receive the echo data independently, whose control sequence is not limited in the present application.

In another embodiment of the present application, the second preset scanning mode can be as follows: only controlling the emitting units corresponding to the non-oversaturated regions to emit laser beams in parallel, and receiving in parallel, by the receiving units, the laser beams.

Refer to FIG. 4 again, taking as an example a scenario of the oversaturated regions and the non-oversaturated regions in a row of the emitting units, the second preset scanning mode only controls the emitting units corresponding to the non-oversaturated regions to emit laser beams in parallel, and the receiving units receive the laser beams in parallel. After it is determined that there are oversaturated regions, the LiDAR controls the emitting unit 0, the emitting unit 1, the emitting unit 4, the emitting unit 5, the emitting unit 8, the emitting unit 9, and the emitting unit 11 to emit laser beams in parallel for measurement. The corresponding receiving units receive the echo data in parallel to obtain the above second echo data.

S13: performing data fusion processing based on the first echo data and the second echo data to obtain target data.

In the embodiment of the present application, to avoid interference of the oversaturated region to surrounding pixels and improve measurement accuracy, the echo data of the oversaturated regions and the echo data of the non-oversaturated regions used for the data fusion processing can be determined first via the first echo data and the second echo data.

In the embodiment of the present application, the above S13 can include the following steps:

determining the echo data of the oversaturated regions and the echo data of the non-oversaturated regions for the data fusion processing based on the first echo data and the second echo data; and performing the data fusion processing on the echo data of the oversaturated regions and the echo data of the non-oversaturated regions to obtain the target data.

In the embodiment of the present application, the echo data of the oversaturated regions can be extracted by the first echo data. Then, the echo data of the non-oversaturated regions can be extracted by the second echo data. Then, the echo data of the oversaturated regions and the echo data of the non-oversaturated regions perform the data fusion procession to obtain the target data.

In the embodiment of the present application, when the second preset scanning mode is as follows: controlling the emitting units corresponding to the oversaturated regions to independently emit a laser beam for measurement; independently receiving, by the receiving unit, the laser beam; controlling the emitting units corresponding to the non-oversaturated regions to emit laser beams in parallel; and receiving in parallel, by the receiving units, the laser beams. The echo data of the oversaturated regions and the echo data of the non-oversaturated regions used for the data fusion processing can be directly obtained from the second echo data. That is, the emitting units corresponding to the oversaturated regions are controlled to emit the laser beams independently for measurement. The obtained echo data are the echo data of the oversaturated regions which can be used for the data fusion processing. The emitting units corresponding to the non-oversaturated regions are controlled to emit the laser beams in parallel for measurement. The obtained echo data are the echo data of the non-oversaturated regions which can be used for the data fusion processing.

In the embodiment of the present application, to improve the accuracy of echo data in the oversaturated regions, the first echo data of the oversaturated regions can also be extracted from the first echo data. Then, the second echo data of the oversaturated regions are extracted from the second echo data. The first echo data of the oversaturated regions and the second echo data of the oversaturated regions are filtered to obtain the filtered echo data in the oversaturated regions that can be used for the data fusion processing, while the echo data in the non-oversaturated regions are the echo data obtained by controlling the corresponding emitting units in the non-oversaturated regions to emit the laser beams in parallel for measurement.

In an exemplary application, the first echo data in the oversaturated regions and the second echo data in the oversaturated regions are filtered to obtain the echo data in the oversaturated regions. The echo data of the oversaturated regions can be filtered by a filter, for example, by a plurality of filtering modes such as smooth filtering, median filtering, or mean filtering, which is not limited in the present application.

In the embodiment of the present application, a process of performing the data fusion processing on the echo data of the oversaturated regions and the echo data of the non-oversaturated regions is as follows. With automatic calibration and automatic compensation of the oversaturated regions, the echo data of the oversaturated regions are automatically calibrated and automatically compensated. Automatic calibration and automatic compensation are carried out for the echo data in the non-oversaturated regions via automatic calibration and automatic compensation in the non-oversaturated regions. Then, the echo data of the oversaturated regions after the automatic calibration and the automatic compensation and the echo data of the non-oversaturated regions after the automatic calibration and the automatic compensation are combined based on a pixel position. A complete row of echo data (specifically, point cloud data) can be obtained.

By processing each row of echo data of the LiDAR, the target data can be obtained with crosstalk caused by oversaturated being eliminated. It can be understood that parallel emission of the emitting units in the non-oversaturated regions can effectively improve the scanning efficiency of the LiDAR.

In an exemplary application, distance information from the target object in the scanning region can be determined by recovering an echo waveform according to the target data obtained by performing the data fusion processing. This part can refer to the existing echo waveform recovery method and distance determination algorithm, which are not described in detail in the present application.

As can be seen from the above, by controlling the LiDAR to measure according to the first preset scanning mode and the second preset scanning mode, and then performing the data fusion processing based on the first echo data and the second echo data, the LiDAR control method provided by the embodiment of the present application can effectively eliminate signal crosstalk caused by too high reflection energy of an object with high reflectivity, thus greatly improving measurement accuracy.

Figure 6:
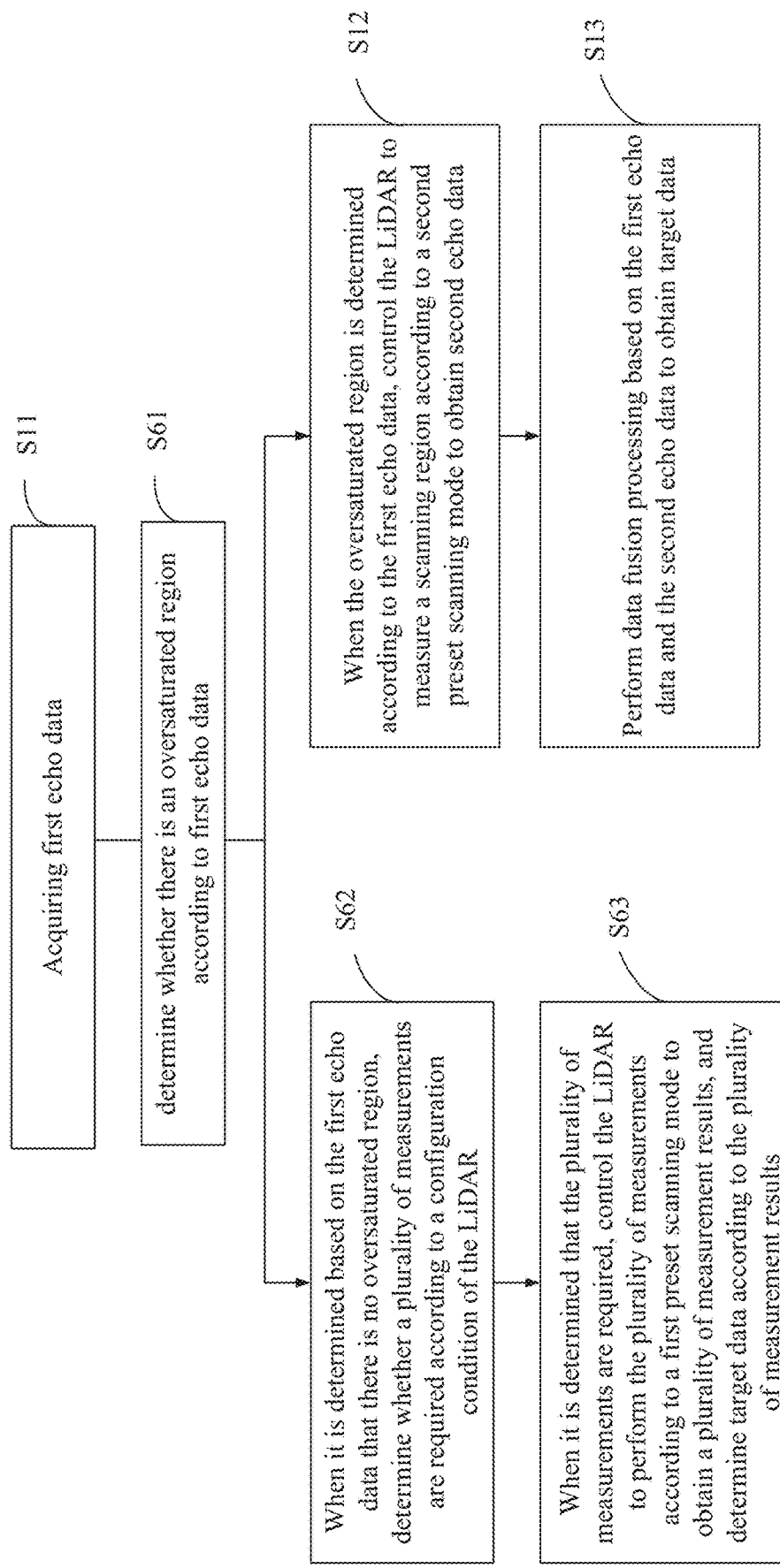
FIG. 6 is a schematic diagram of an implementation flow of another LiDAR control method provided by an embodiment of the present application.

FIG. 6 shows an implementation flow diagram of another LiDAR control method provided by the embodiment of the present application. Referring to FIG. 6, different from FIG. 2, the LiDAR control method provided in the embodiment of the present application can further include the following steps before S12.

S61: determining whether there is an oversaturated region according to first echo data.

S62: when it is determined based on the first echo data that there is no oversaturated region, determining whether a plurality of measurements are required according to a configuration condition of LiDAR S63: when it is determined that the plurality of measurements are required, controlling the LiDAR to perform the plurality of measurements according to a first preset scanning mode to obtain a plurality of measurement results, and determining target data according to the plurality of measurement results.

In the embodiment of the present application, to determine whether an object in a scanning region is an object with high reflectivity, it can first determine whether there is the oversaturated region according to the first echo data.

Figure 7:
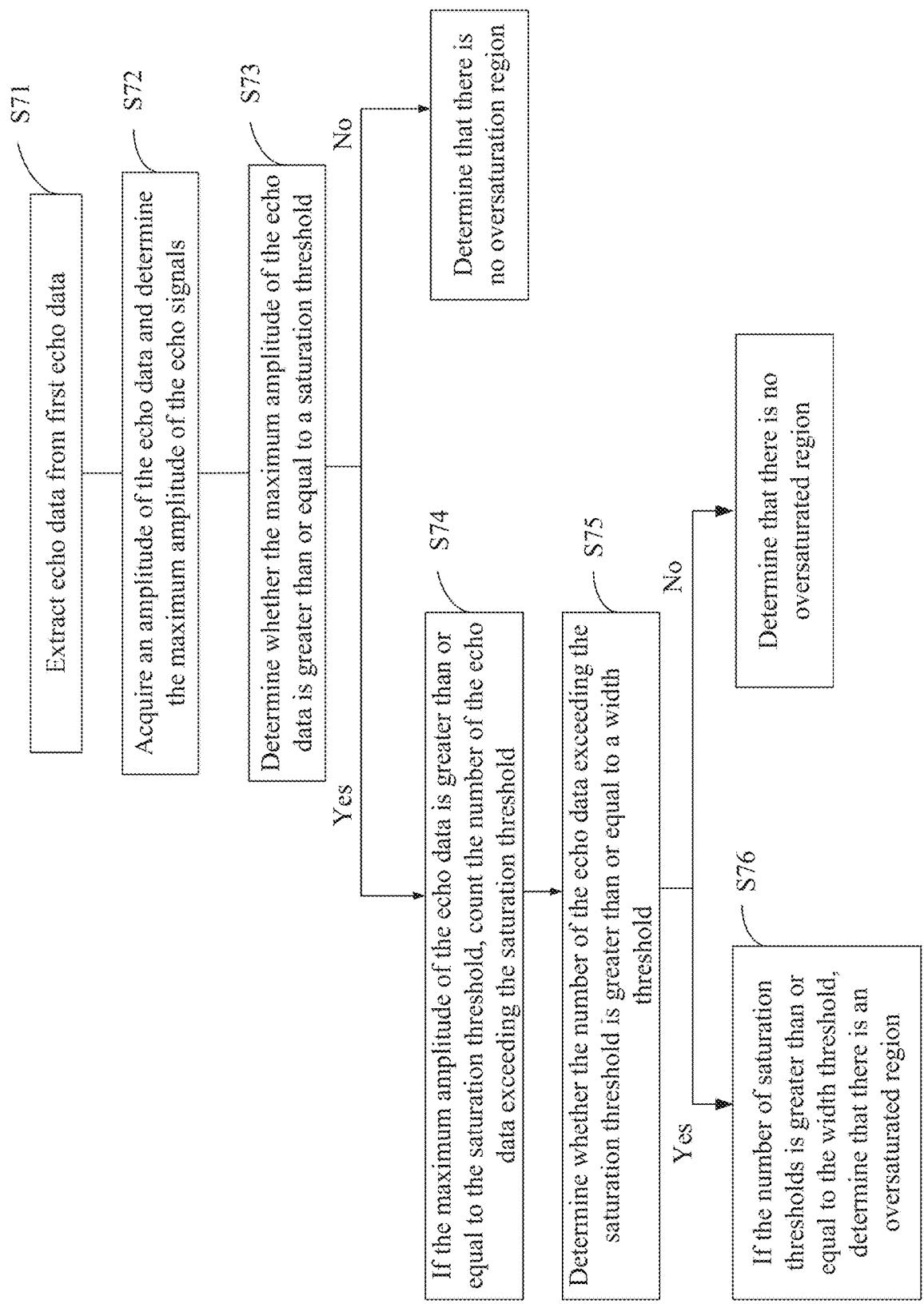
FIG. 7 is a schematic diagram of a specific implementation flow of Step S61 in a LiDAR control method provided by an embodiment of the present application.

Referring to FIG. 7, in an embodiment of the present application, the above S61 can include the following steps.

S71: extracting echo data according to the first echo data;

S72: acquiring amplitudes of items of the echo data and determining the maximum amplitude of the echo data;

S73: determining whether the maximum amplitude of the echo data is greater than or equal to a saturation threshold;

S74: if the maximum amplitude of the echo data is greater than or equal to the saturation threshold, counting the number of items of the echo data having amplitudes exceeding the saturation threshold; otherwise, determining that there is no oversaturated region.

S75: determining whether the number of the echo data having the amplitudes exceeding the saturation threshold is greater than or equal to a width threshold;

S76: if the number of saturation thresholds is greater than or equal to the width threshold, determining that there is an oversaturated region; otherwise, determining that there is no oversaturated region.

In an exemplary application, a process of determining whether there is an oversaturated region according to the first echo data can be as follows: extracting the first echo data to obtain the echo data, and data extraction can be performed by using histogram extraction or ADC sampling; calculating the amplitude of the obtained echo data, and determining whether the maximum amplitude exceeds the saturation threshold. If the maximum amplitude does not exceed the saturation threshold, it indicates that there is no oversaturated region. If the maximum amplitude is greater than or equal to the saturation threshold, the amplitude exceeding the saturation threshold being a saturated amplitude, counting a saturation number of the max amplitude of the echo date exceeding the saturation threshold, and determining whether the saturation number is greater than a width amplitude. If the saturation number does not exceed the width threshold, it indicates that there is no oversaturated region. If the saturation amount is greater than or equal to the width threshold, it indicates that there is an oversaturated region. The saturation threshold and the width threshold can be determined according to an actual application scenario, which is not limited by the present application.

It should be noted that a pixel region whose maximum amplitude exceeds (greater than or equal to) the saturation threshold is determined as the oversaturated region, and a region not exceeding the saturation threshold is defined as the non-oversaturated region.

It should be noted that when the LiDAR is a LiDAR system with an adjustable power or an adjustable reception gain, it is only necessary to count the amplitude of the echo data and determine whether the maximum amplitude exceeds the saturation threshold. When the maximum amplitude is greater than or equal to the saturation threshold, it is determined that the oversaturated region is provided.

In the embodiment of the present application, when it is determined that there is an oversaturated region, it indicates that all the obtained first echo data are valid data, and then the information such as the distance, size, and speed of the target object in the scanning region can be directly analyzed based on the first echo data. To improve measurement accuracy, it is also possible to determine whether a plurality of measurements are needed according to a configuration condition of the LiDAR. An objective of the plurality of measurements is to analyze the distance, size, speed, and other information of the target object in the scanning region via the measurement results of the plurality of measurements.

It should be noted that the above configuration condition can be frame rate configuration and accuracy requirements of the LiDAR. The lower the frame rate configuration, the more repetitions can be used for the plurality of measurements. The higher the precision requirement, the more repetitions are needed.

In the embodiment of that present application, if there is no oversaturated region, it is only necessary to control the LiDAR to make the plurality of measurements according to the first preset scanning mode, so that the measurement results of the plurality of measurements can be obtained, and then the target data can be obtained after the measurement results of the plurality of measurements are filtered. Based on the target data, the distance, size, speed, and other information of the target object in the scanning region are analyzed, which can effectively improve the measurement accuracy.

It should be noted that the above filtering processing of the measurement results of the plurality of measurements can also be realized by using the filter, and the filtering mode can adopt a common filtering mode such as smooth filtering, median filtering, mean filtering, etc., which is not limited in the present application.

To further explain a workflow of the LiDAR control method provided by the embodiment of the present application, the following is explained in conjunction with scanning timing.

Figure 8:
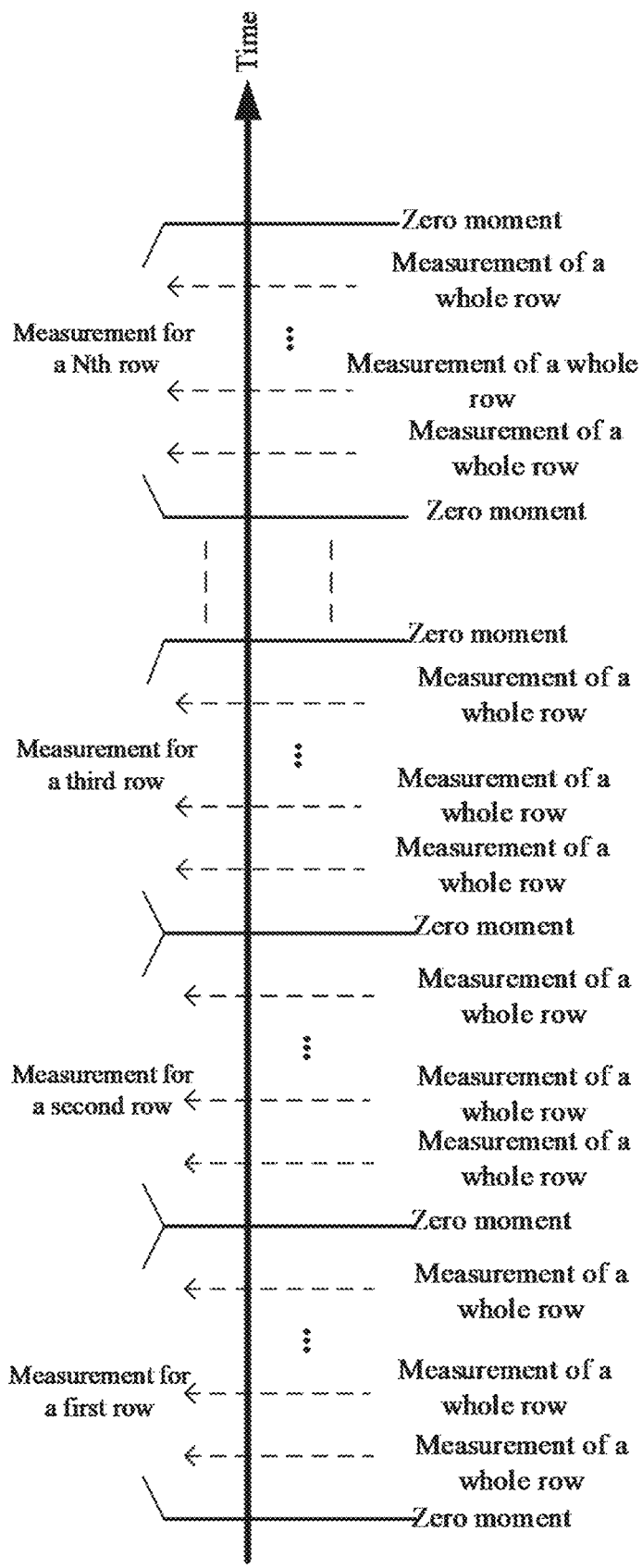
FIG. 8 is a scanning timing diagram of a LiDAR control method provided by an embodiment of the present application without the presence of an oversaturated region.

FIG. 8 shows a scanning timing diagram of the LiDAR control method provided by the embodiment of the present application without the presence of the oversaturated region. As shown in FIG. 8, since there is no oversaturated region, when the LiDAR is controlled to scan, a first row is first controlled to perform measurement of a whole row, then a second row is controlled to perform the measurement of the whole row, then a third row is controlled to perform the measurement of the whole row, and so on until a last row (an Nth row) is controlled to perform the measurement of the whole row. It should be noted that when the LiDAR is controlled to measure the whole row, a measuring order of the number of rows can be disturbed to measure, which is not limited in the present application.

Figure 9:
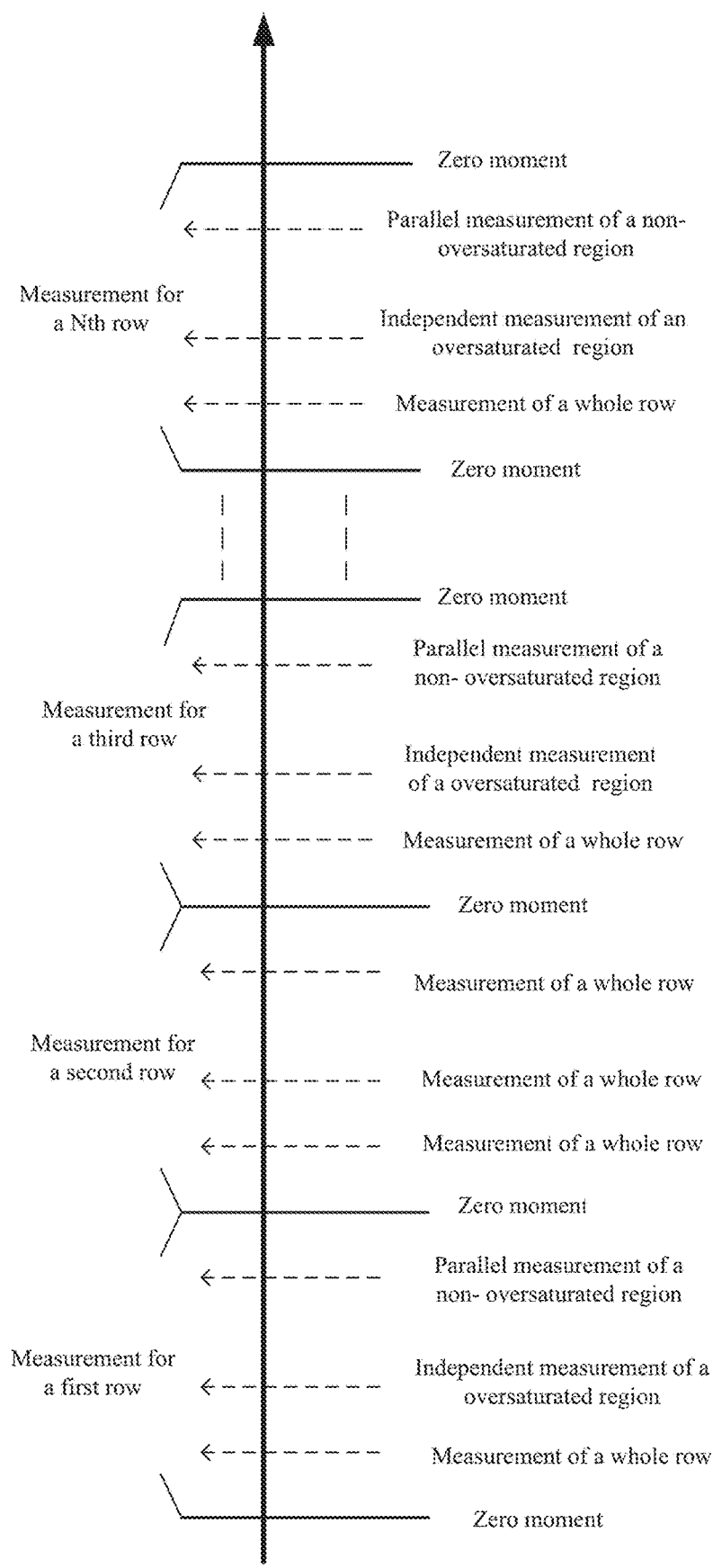
FIG. 9 is a scanning timing diagram of a LiDAR control method provided by an embodiment of the present application with the presence of an oversaturated region.

FIG. 9 shows a scanning timing diagram of the LiDAR control method provided by the embodiment of the present application with the presence of the oversaturated region. Taking as an example a scenario where there are oversaturated regions in the first row, the third row, and the Nth row, while there is no oversaturated region in the second row, as shown in FIG. 9, when the first row is measured, the first row is first controlled to measure the whole row and obtain first echo data of the first row. After the oversaturated regions and the non-oversaturated regions are determined, the oversaturated regions are controlled to measure independently, and the non-oversaturated regions are controlled to measure in parallel. When the second row is measured, the second row is directly controlled to measure the whole row. When the third row is measured, the third row is first controlled to measure the whole row to obtain first echo data of the third row. The oversaturated regions and the non-oversaturated regions are determined. Then, the oversaturated regions in the third row are controlled to measure independently. The non-oversaturated regions in the third row are controlled to measure in parallel. By analogy, when the Nth row is measured, the whole Nth row is measured first to obtain first echo data of the Nth row. After the oversaturated regions and the non-oversaturated regions are determined, the oversaturated regions are controlled to measure independently, and the non-oversaturated regions are controlled to measure in parallel.

Figure 10:
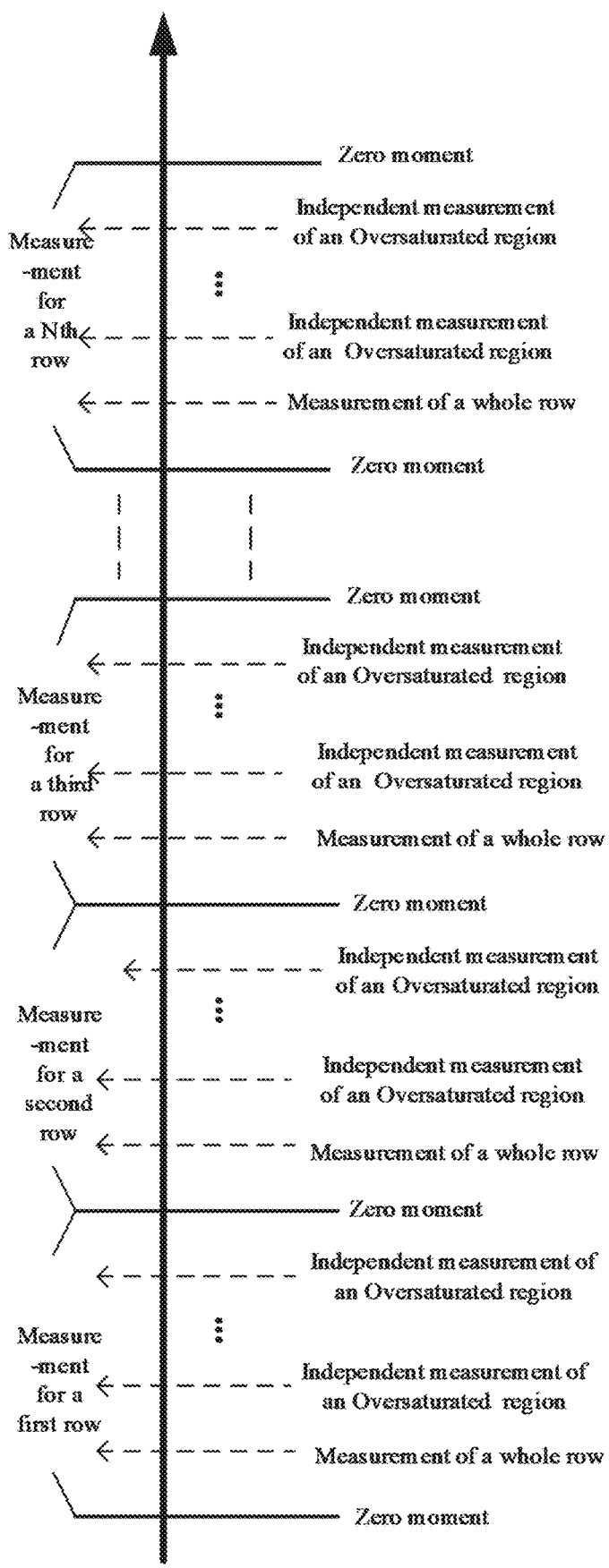
FIG. 10 is a scanning timing diagram of a LiDAR control method provided by an embodiment of the present application in a case that all rows are detected to be oversaturated regions at the time of measurement.

FIG. 10 shows a scanning timing diagram of the LiDAR control method provided by the embodiment of the present application in a case where all the rows are detected to have oversaturated regions at the time of measurement. As shown in FIG. 10, since all the rows are detected to have oversaturated regions during the measurement, when the LiDAR is controlled to scan, the oversaturated regions in the first row are controlled to measure independently. Then, the oversaturated regions in the second row are controlled to measure independently. Then, the oversaturated regions in the third row are controlled to measure independently, and so on until the last row (the Nth row) is controlled to measure independently.

It should be understood that a sequence number of each step in the above embodiment does not mean an execution order. An execution order of each process is determined by a function and an inherent logic thereof, which does not make any limitation on an implementation process of the embodiment of the present application.

Based on the LiDAR control method provided by the embodiment, the present disclosure further provides an embodiment of a terminal apparatus for realizing the above method embodiment.

Figure 11:
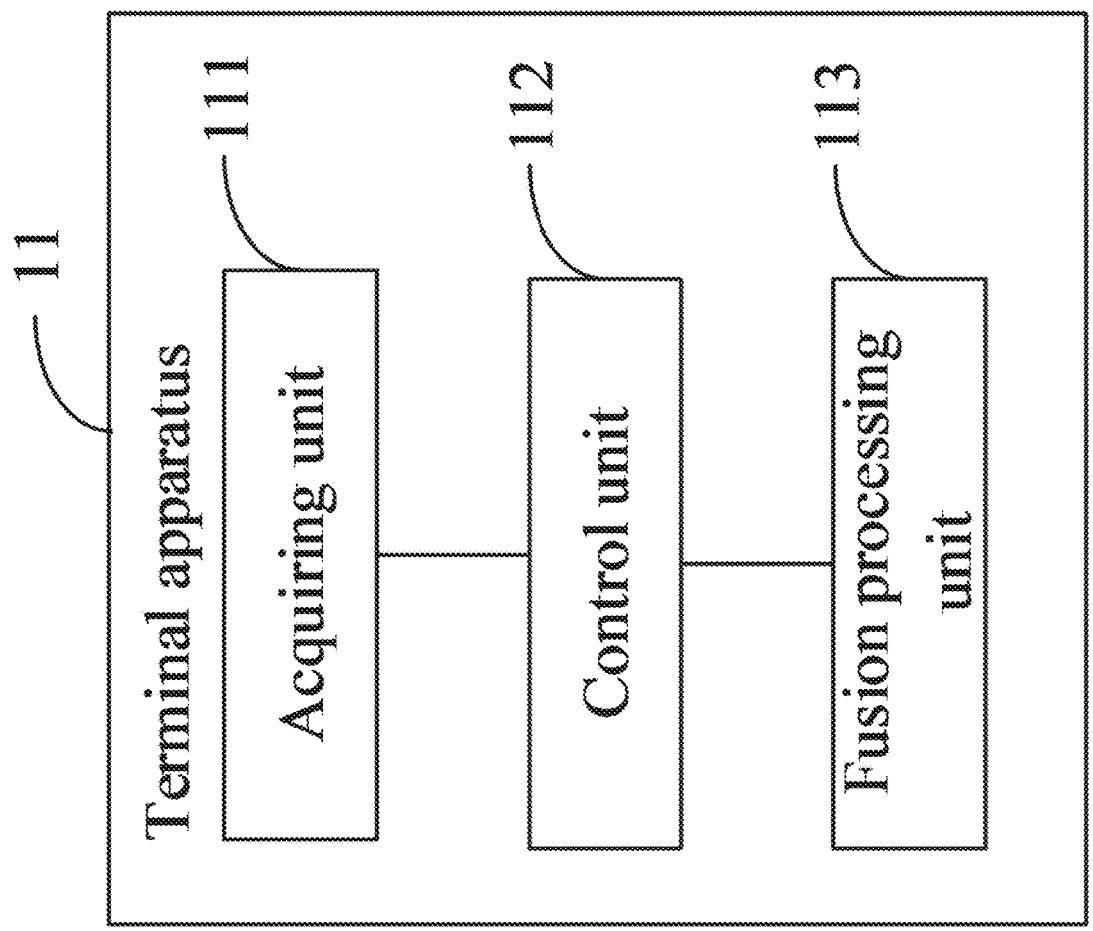
FIG. 11 is a schematic structural diagram of a terminal apparatus provided by an embodiment of the present application.

FIG. 11 is a schematic structural diagram of a terminal apparatus provided by the embodiment of the present application. The terminal apparatus includes respective units for performing the steps in the corresponding embodiment of FIG. 2. As shown in FIG. 11, the terminal apparatus 11 includes an acquiring unit 111, a control unit 112, and a fusion processing unit 113.

The acquiring unit 111 is configured to acquire first echo data. The first echo data are acquired by a receiving array after being measured by a LiDAR emitting laser beams according to a first preset scanning mode.

The control unit 112 is configured to control the LiDAR to measure a scanning region according to a second preset scanning mode when it is determined based on the first echo data that there is an oversaturated region, to obtain second echo data.

The fusion processing unit 113 is configured to perform data fusion processing based on the first echo data and the second echo data to obtain target data.

In one embodiment of the present application, the terminal apparatus can further include an identifying unit and a determining unit.

The identifying unit is configured to determine whether there is an oversaturated region according to the first echo data.

The determining unit is configured to determine whether a plurality of measurements are required according to a configuration condition of the LiDAR when it is determined based on the first echo data that there is no oversaturated region.

When it is determined that the plurality of measurements are required, the control unit 112 is configured to control the LiDAR to perform the plurality of measurements according to the first preset scanning mode to obtain a plurality of measurement results, and determine the target data according to the plurality of measurement results.

In one embodiment of the present application, the identifying unit is configured to: extract echo data according to the first echo data; acquire an amplitude of the echo data and determine the maximum amplitude of the echo data; determine whether the maximum amplitude of the echo data is greater than or equal to the saturation threshold; if the maximum amplitude of the echo data is greater than or equal to the saturation threshold, count the number of the maximum amplitude of the echo data exceeding the saturation threshold; otherwise, determine that there is no oversaturated region; determine whether the number of the echo data exceeding the saturation threshold is greater than or equal to a width threshold; if the number of saturation thresholds is greater than or equal to the width threshold, determine that there is an oversaturated region; otherwise, determine that there is no oversaturated region.

In one embodiment of the present application, the above fusion processing unit 113 can include the determining unit and a fusing unit.

The determining unit is configured to determine echo data of the oversaturated region and echo data of the non-oversaturated region for the data fusion processing based on the first echo data and the second echo data.

The fusing unit is configured to perform the data fusion processing on the echo data of the oversaturated region and the echo data of the non-oversaturated region to obtain the target data.

In one embodiment of the present application, the determining unit is configured to: extract the echo data of the oversaturated region via the first echo data, and extract the echo data of the non-oversaturated region via the second echo data; or, extract the echo data of the oversaturated region and the echo data of the non-oversaturated region via the second echo data; or, extract the first echo data of the oversaturated region via the first echo data, extract the second echo data of the oversaturated region via the second echo data, filter the first echo data of the oversaturated region and the second echo data of the oversaturated region to obtain the filtered echo data of the oversaturated region, and extract the echo data of the non-oversaturated region via the second echo data.

It should be noted that information interaction, execution process, and other contents among the above respective units are based on the same idea as the method embodiment of the present application. Specific functions and technical effects thereof can be referred to the method embodiment section for details, which is not repeated here.

Figure 12:
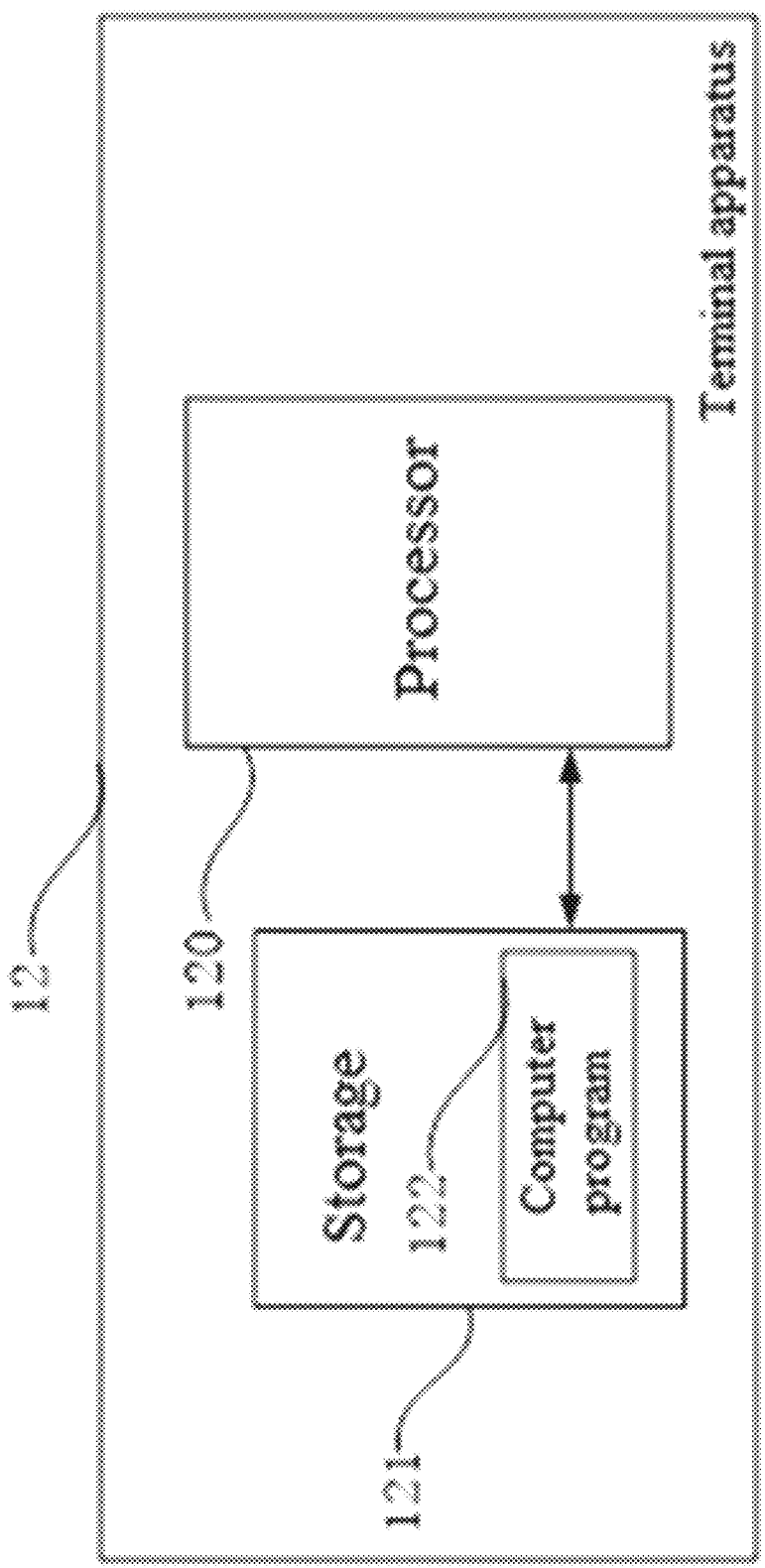
FIG. 12 is a schematic structural diagram of a terminal apparatus provided by another embodiment of the present application.

FIG. 12 is a schematic structural diagram of a terminal apparatus provided by another embodiment of the present application. As shown in FIG. 12, the terminal apparatus 12 includes a processor 120, a storage 121, and computer program 122, such as an image segmentation program, stored in the storage 121 and executable on the processor 120. When the processor 120 executes the computer program 122, the steps in respective LiDAR control method embodiments described above such as S11 to S13 shown in FIG. 2 are implemented. Alternatively, when the processor 120 executes the computer program 122, a function of a module/a unit in the embodiment of the terminal apparatus such as functions of units 111 to 113 shown in FIG. 11 is realized.

Exemplarily, the computer program 122 can be divided into one or more modules/units. The one or more modules/units are stored in the storage 121 and executed by the processor 120 to complete the present application. The one or more modules/units can be a series of computer program instruction segments capable of performing specific functions. The instruction segments are configured to describe an execution process of the computer program 122 in the terminal apparatus 12. For example, the computer program 122 can be divided into a plurality of units. Specific functions of the respective units are described in the corresponding embodiment in FIG. 11, which is not described here.

The terminal apparatus can include, but is not limited to, the processor 120 and the storage 121. The person skilled in the art can understand that FIG. 12 is merely an example of the terminal apparatus 12 and does not make a limitation on the terminal apparatus 12. The terminal apparatus 12 can include more or fewer components than illustrated, or a combination of certain components, or different components. For example, the terminal apparatus further includes an input-output device, a network access apparatus, and a bus.

The processor 120 can be a Central Processing Unit (CPU), other general-purpose processors, Digital Signal Processors (DSP), Application Specific Integrated Circuit (ASIC), Field-Programmable Gate Array (FPGA) or other programmable logic devices, discrete gates or transistor logic devices, discrete hardware components, and the like. The general-purpose processor can be a microprocessor, or the processor can be any conventional processor or the like.

The storage 121 can be an internal storage unit of the terminal apparatus 12 such as a hard disk or a memory of the terminal apparatus 12. The storage 121 can also be an external storage apparatus of the terminal apparatus 12, such as a plug-in hard disk, a Smart Media Card (SMC), a Secure Digital (SD) card, a Flash Card, or the like provided on the terminal apparatus 12. Further, the storage 121 can also include both the internal storage unit and the external storage apparatus of the terminal apparatus 12. The storage 121 is configured to store the computer program and other program and data required by the terminal apparatus. The storage 121 can also be configured to temporarily store data that has been output or will be output.

Figure 13:
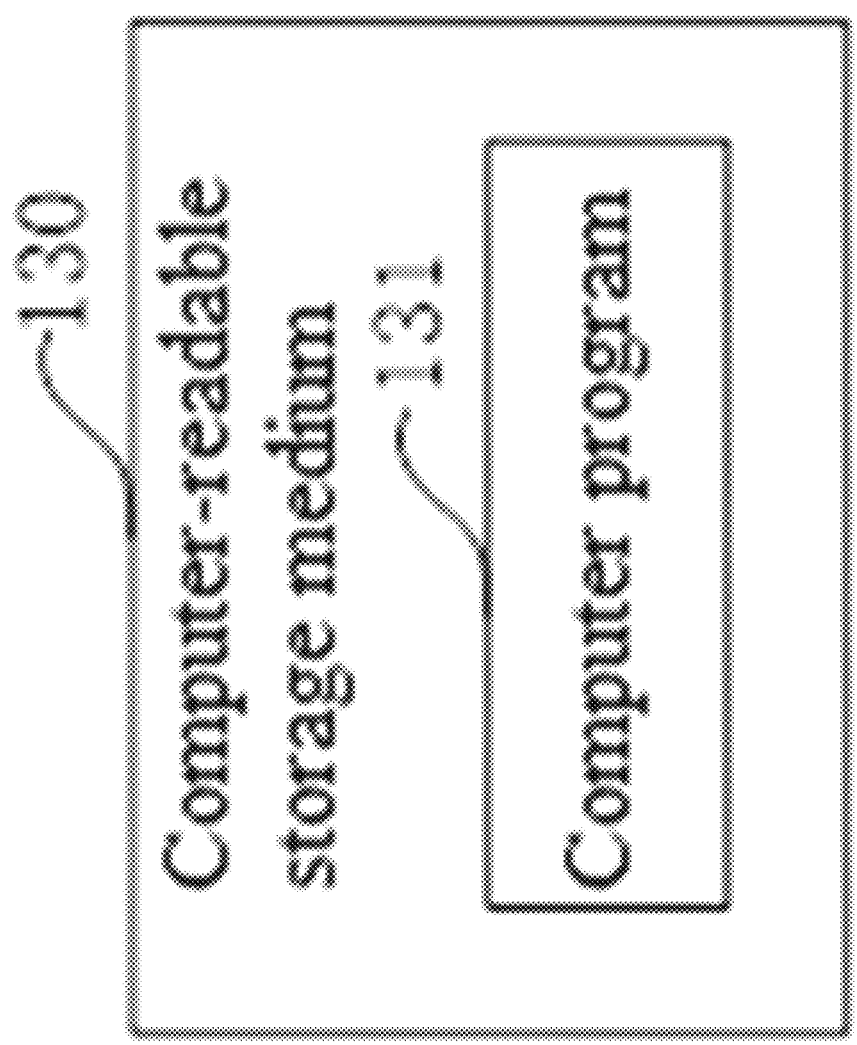
FIG. 13 is a schematic structural diagram of a computer-readable storage medium provided by an embodiment of the present application.

The embodiment of the present application also provides a computer-readable storage medium. FIG. 13 is a schematic structure diagram of a computer-readable storage medium provided by the embodiment of the present application. As shown in FIG. 13, computer program 131 is stored in the computer-readable storage medium 130. The above LiDAR control method can be realized when the computer program 131 is executed by a processor.

The embodiment of the present application provides a computer program product. When the computer program product is operated on a terminal apparatus, the terminal apparatus implements the LiDAR control method during execution.

It should be understood by the person skilled in the art that for convenience and conciseness of description, only divisions of the above functional units and modules are described by taking as an example. In practical application, the above functional allocation can be completed by different functional units and modules according to actual needs. That is, an internal structure of the terminal apparatus is divided into different functional units or modules to complete all or part of functions described above. Each functional unit and module in the embodiment can be integrated in one processing unit. Each unit can exist physically alone. Two or more units can be integrated in one unit. An integrated unit can be realized in a form of a hardware or a software functional unit. In addition, specific names of each functional unit and module are only for the convenience of distinguishing each other, and are not used to limit the scope of protection of the present application. Specific working processes of the unit and the module in the above system can refer to the corresponding process in the above method embodiment, which is not repeated here.

In the above embodiments, the description of each embodiment has its own emphasis. Parts not detailed or recorded in one embodiment can refer to the related descriptions of other embodiments.

The person skilled in the art can know that respective example units and algorithm steps described in conjunction with the embodiments disclosed herein can be implemented in an electronic hardware or a combination of computer software and the electronic hardware. Whether these functions are performed in a hardware or software depends on specific application and design constraints of the technical solution. The person skilled in the art can use different methods for each particular application to implement the described function but such implementation should not be considered outside the scope of the present application.

The above embodiments are intended for describing instead of limiting the technical solutions of the present invention. Although the present application is described in detail with reference to the above embodiments, the person skilled in the art should understand that modifications to the technical solutions described in the above embodiments can be made or equivalent replacements to some technical features thereof can be made. And these modifications or replacements do not make the essence of the corresponding technical solutions depart from the spirit and scope of the technical solutions of the embodiments of the present application, and should be included in the scope of protection of this application.

What is claimed is:

1. A LiDAR control method, comprising:
acquiring first echo data, the first echo data being collected by a receiving array after a LiDAR emits a laser beam according to a first preset scanning mode to measure a scanning region;
when an oversaturated region is determined to exist based on the first echo data, controlling the LiDAR to measure the scanning region according to a second preset scanning mode to obtain second echo data, wherein the second preset scanning mode comprises:
controlling emitting units corresponding to non-oversaturated regions to emit laser beams in parallel;
receiving in parallel, by receiving units, the laser beams; and performing data fusion processing based on the first echo data and the second echo data to obtain target data, wherein after acquiring the first echo data, the method further comprises:

determining whether there are oversaturated regions according to the first echo data;

when it is determined based on the first echo data that there are no oversaturated regions, determining whether a plurality of measurements are required according to a configuration condition of the LiDAR;

when it is determined that the plurality of measurements are required, controlling the LiDAR to perform the plurality of measurements according to the first preset scanning mode to obtain a plurality of measurement results; and determining the target data according to the plurality of measurement results.

2. The LiDAR control method according to claim 1, wherein determining whether there are oversaturated regions based on the first echo data comprises:

extracting echo signals according to the first echo data;

acquiring amplitudes of the echo signals and determining a maximum amplitude of the echo signals;

determining whether the maximum amplitude of the echo signals is greater than or equal to a saturation threshold;

if the maximum amplitude of the echo signals is greater than or equal to the saturation threshold, counting a number of the echo signals having amplitudes exceeding the saturation threshold; otherwise, determining that there are no oversaturated regions;

determining whether the number of the echo signals having the amplitudes exceeding the saturation threshold is greater than or equal to a width threshold; and if the number of the maximum amplitude of the echo signals exceeding the saturation threshold is greater than or equal to the width threshold, determining that there is an oversaturated region; otherwise, determining that there is no oversaturated region.

3. The LiDAR control method according to claim 1, wherein the second preset scanning mode further comprise:

controlling an emitting unit corresponding to the oversaturated region to emit a laser beam independently for measurement; and independently receiving, by the receiving units, the laser beams.

4. The LiDAR control method according to claim 1, wherein performing the data fusion processing based on the first echo data and the second echo data to obtain the target data comprises:

determining echo data of the oversaturated regions and echo data of non-oversaturated regions for the data fusion processing based on the first echo data and the second echo data; and performing the data fusion processing on the echo data of the oversaturated regions and the echo data of the non-oversaturated regions to obtain the target data.

5. The LiDAR control method according to claim 4, wherein determining the echo data of the oversaturated regions and the echo data of the non-oversaturated regions for the data fusion processing based on the first echo data and the second echo data comprises:

extracting the echo data of the oversaturated regions via the first echo data, and extracting the echo data of the non-oversaturated regions via the second echo data; or extracting the echo data of the oversaturated regions and the echo data of the non-oversaturated regions via the second echo data; or extracting the first echo data of the oversaturated regions via the first echo data, extracting the second echo data of the oversaturated regions via the second echo data, filtering the first echo data of the oversaturated regions and the second echo data of the oversaturated regions to obtain the filtered echo data of the oversaturated regions, and extracting the echo data of the non-oversaturated regions via the second echo data.

6. A terminal apparatus, comprising:

an acquiring unit, configured to acquire first echo data, wherein the first echo data is acquired by a receiving array a LiDAR emits a laser beam according to a first preset scanning mode to measure a scanning region;

a control unit, configured to control the LiDAR to measure the scanning region according to a second preset scanning mode when it is determined according to the first echo data that there are oversaturated regions, to obtain second echo data, wherein the second preset scanning mode comprises:

controlling emitting units corresponding to non-oversaturated regions to emit laser beams in parallel;

receiving in parallel, by receiving units, the laser beams;

a fusion processing unit, configured to perform data fusion processing based on the first echo data and the second echo data to obtain target data; and a determining unit, configured to determine whether there are oversaturated regions according to the first echo data, wherein when it is determined based on the first echo data that there are no oversaturated regions, determine whether a plurality of measurements are required according to a configuration condition of the LiDAR;

when it is determined that the plurality of measurements are required, control the LiDAR to perform the plurality of measurements according to the first preset scanning mode to obtain a plurality of measurement results; and determine the target data according to the plurality of measurement results.

* * * * *